United States Patent [19]

Isenberg et al.

[11] Patent Number: 4,582,766

[45] Date of Patent: Apr. 15, 1986

[54] HIGH PERFORMANCE CERMET ELECTRODES

[75] Inventors: Arnold O. Isenberg, Forest Hills Boro; Gregory E. Zymboly, Penn Hills, both of Pa.

[73] Assignee: Westinghouse Electric Corp., Pittsburgh, Pa.

[21] Appl. No.: 716,864

[22] Filed: Mar. 28, 1985

[51] Int. Cl.[4] .............................................. H01M 8/12
[52] U.S. Cl. ........................................ 429/30; 429/41; 429/45; 429/193
[58] Field of Search ..................................... 429/30-33, 429/41, 44, 45, 191, 193

[56] References Cited

U.S. PATENT DOCUMENTS 3,219,730  11/1965  Blitton et al. ...................... 429/30 X
3,525,646  8/1970  Tannenberger et al. ............. 429/31
3,573,993  4/1971  Pabst et al. ............................ 429/30

Primary Examiner—Anthony Skapars
Attorney, Agent, or Firm—R. D. Fuerle

[57] ABSTRACT

Disclosed is a method of increasing the operating cell voltage of a solid oxide electrochemical cell having metal electrode particles in contact with an oxygen-transporting ceramic electrolyte. The metal electrode is heated with the cell, and oxygen is passed through the oxygen-transporting ceramic electrolyte to the surface of the metal electrode particles so that the metal electrode particles are oxidized to form a metal oxide layer between the metal electrode particles and the electrolyte. The metal oxide layer is then reduced to form porous metal between the metal electrode particles and the ceramic electrolyte.

14 Claims, 3 Drawing Figures

HIGH PERFORMANCE CERMET ELECTRODES

BACKGROUND OF THE INVENTION

The Government of the United States of America has rights in this invention pursuant to Contract No. DE-AC0280-ET17089 awarded by the U.S. Department of Energy.

A fuel cell, in one embodiment, consists of a support tube over which is deposited an air electrode layer, followed by a layer of a ceramic electrolyte, and then a layer of a fuel electrode. Oxygen is transported through the air electrode to its interface with the electrolyte where it is reduced to oxygen ions which migrate through the ceramic electrolyte to the fuel electrode. Here, electrons are collected by the fuel electrode and the oxygen reacts with the gaseous fuel.

The fuel electrode material generally consists of a sintered powdered metal, such as nickel or cobalt. Because there is a factor of about 1.6 between the coefficient of thermal expansion of the metal electrode and the coefficient of thermal expansion of the ceramic electrolyte with which it is in contact, there is a tendency for the metal electrode to separate from the ceramic electrolyte, interrupting the electrical circuit through the cell and preventing the cell from generating electricity. One way of overcoming this problem is to deposit a ceramic coating over the electrolyte and partially around the metal electrode particles, thereby bonding the electrode particles to the electrolyte. The ceramic coating conducts oxygen ions as does the electrolyte and it has a low electronic conductivity. The ceramic coating has also a low porosity for electrochemical fuel oxidation. The major electrochemically active sites of the electrode are at the three-phase interface of the metal electrode particles to the ceramic coating, and to the gas phase, which is the fuel gas. Because this interface is only a thin line at the border of the ceramic coating and the metal electrode particles, the ability of the cell to convert fuel and exygen into electricity is limited.

SUMMARY OF THE INVENTION

We have discovered a method of greatly increasing the active electrochemical reaction sites between the electrolyte, through its ceramic coating, and the metal electrode particles. As a result, we are able to obtain a higher cell voltage. In addition, we have found that the process of this invention is useful in revitalizing electrodes whose voltage has decreased due to electrode densification through sintering of the metal particles.

DESCRIPTION OF THE INVENTION

FIG. 1 is a side view in section of a portion of a solid oxide fuel cell, and shows metal electrode particles bonded to an electrolyte by means of a ceramic coating. (The remainder of the fuel cell and details of its construction can be found in U.S. Pat. Nos. 4,395,468 and 3,400,054, herein incorporated by reference.)

Figure 1:
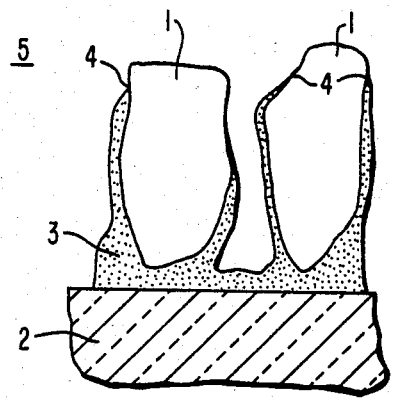

In FIG. 1, metal electrode particles 1 are bonded to electrolyte 2 by means of ceramic coating 3. The active electrochemical sites 4 are at the interface of metal particles 1, ceramic coating 3, and the space 5 surrounding the electrode particles 1, through which the fuel passes.

The electrolyte shown in FIG. 1 can have any shape as long as it has two opposing surfaces. The preferred shape is a tube sealed at one end, as that configuration is most useful for solid oxide fuel cells. The thickness of the electrolyte is not critical but it must be a solid material through which oxygen can diffuse or permeate in a solid state diffusion. The electrolyte material is preferably an oxide having a fluoride structure or a mixed oxide in the perovskite family, but other simple oxides, mixed oxides, or mixtures of simple and mixed oxides can be used. The preferred electrolyte material is stabilized zirconia. The zirconia can be stabilized with a number of elements, as is well known in the art, but yttria stabilized zirconia is preferred as it has excellent oxygen ion mobility. A preferred composition is $(ZrO_2)_{0.90}(Y_2O_3)_{0.10}$ as that material works well in a solid oxide fuel cell. The yttrium oxide concentration can vary widely, for instance from 5 to 20 mol percent in the zirconium without affecting performance of cells considerably. Other mixed oxides can be used, for instance yttrium doped thorium oxide and gadolinium doped ceria. The method of this invention is applicable to oxide layers that transfer oxygen in any form, including mono-atomic oxygen as well as ionic oxygen.

The conductive material that forms the electrode is a porous metal of any particle size and thickness. Best results in fabrication have been obtained using particles about 1 to about 5 microns thick, since it is difficult to make larger particles adhere to the electrolyte. A preferred electrode thickness is about 50 to about 200 microns, though the thickness is adjusted to the desired conductivity of the cell. In general, any electronic conductor can be used to form the electrode. Metals that can be used include nickel, cobalt, iron, copper, chromium, and alloys and mixtures thereof. The preferred metals are nickel and cobalt and alloys and mixtures thereof, as these metals are less expensive, more stable, more sulfur resistant, and have an acceptable oxidation potential. The metal electrode particles can be applied to the electrolyte as a powder layer in many different ways, including slurry dipping, spraying, and tape transfer. The preferred method of application is a tape transfer technique because of ease of mass fabrication, registering of dimensons, and uniformity in thickness and porosity.

The ceramic coating that partially covers the metal electrode particles and binds them to the electrolyte is preferably the same material as the electrolyte so that a good bond forms between the ceramic coating and the electrolyte and there is a good thermal match between the two materials. The ceramic coating can be formed from two reactants and is typically about 1 μm to about 5 μm thick. Details on the formation of a ceramic coating can be found in copending application Ser. No. 716,865, filed on Mar. 28, 1985, herein incorporated by reference.

In the first step of the process of this invention, the metal electrode particles that are in contact with the electrolyte and/or the ceramic coating are oxidized to the corresponding metal oxide. This can be accomplished by heating the cell in the absence of a fuel gas (the metal itself becomes the fuel). The cell is heated to a temperature at which the electrolyte conducts oxygen. For fuel cells, this temperature is between about 600° C., the minimum temperature of operation, and a maximum temperature of about 1200° C. Oxygen is provided to the metal electrode/electrolyte interface from the opposing oxygen electrode. The oxygen migrates through the electrolyte, and through the ceramic coating, to the surface of the metal electrode where electrochemical oxidation of the metal takes place. An inert gas, such as nitrogen, may be used in space 5 to control the pressure difference between the two sides of the cell.

Figure 2:
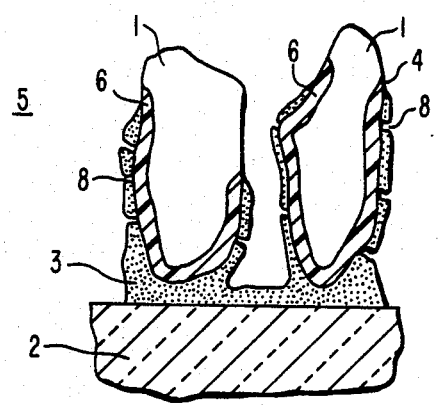
FIG. 2 is a side view in section illustrating the metal electrode particles of FIG. 1 after oxidation according to the first step in the process of this invention.

The result of this oxidation step is shown in FIG. 2. FIG. 2 shows the formation of a metal oxide layer 6 in between the particles 1 of the metal electrode and ceramic coating 3. FIG. 2 also shows that the formation of the oxide has partially extruded the metal particles out of their cavities in the ceramic coating, and has cracked the ceramic coating at positions 8.

The oxidation of the metal electrode particles can continue until all of the metal in the metal electrode layer has been oxidized to metal oxide; preferably, however, only about 10 atom % is oxidized. The amount of metal that has been oxidized can be determined by calculating the number of coulombs of electricity required to oxidize that amount of metal, and then monitoring the amount of current and the length of time that current flows through the cell. After the necessary number of coulombs have passed through the cell, the oxidation step is terminated by beginning the next step of the process of this invention, the reduction step.

Figure 3:
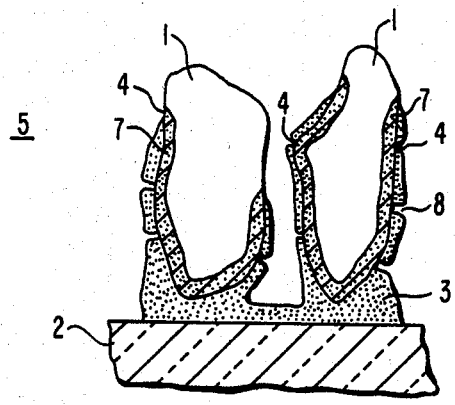
FIG. 3 is a side view in section illustrating the metal electrode particles of FIG. 2 after they have undergone reduction according to another step in the process of this invention.

In the next step of the process of this invention, the metal oxide layer, which was formed in the oxidation step, is reduced to the corresponding metal. While the oxidation step is an electrochemical step, the reduction step is preferably a chemical step, but can also be accomplished electrochemically by applying a reversed polarity from a DC power supply. In the reduction step, a fuel gas is passed through space 5, over the exposed metal electrode particles. The cell is at a temperature sufficiently high to reduce the metal oxide to the metal. While this temperature depends upon the particular metal oxide being reduced, a temperature of about 600° to about 1200° C. is suitable for most metals used in fuel cells, including nickel and cobalt. The reduction step, which usually follows immediately after the electrochemical metal oxidation, is continued until all of the metal oxide has been reduced to metal. The completion of the reduction step can be determined by monitoring the potential across the cell. The reduction is complete when the potential increases from the potential of the metal/metal oxide versus air to the potential of the fuel versus air. For example, nickel/nickel oxide versus air has a potential of nearly 600 millivolts near 1000° C. As the metal oxide is reduced, that potential will increase to the potential of fuel versus air, which depends upon the particular fuel being used, for instance about 1.06 V for $H_2 + 3\%$ $H_2O$. In FIG. 3 the reduction step has been completed, and metal oxide layer 6 has been replaced by porous metal layer 7, which contacts both ceramic coating 3 and metal electrode particles 1, and provides innumerable active electrochemical sites 4.

The revitalization of a cell that has lost performance by densification, is accomplished in the same manner. When this invention is used with electrodes which have been applied to the electrolyte by sintering or other means, severe flaking of electrodes has been observed. This is due to the fact that particles, applied by other methods, are not as securely attached to the electrolyte as are particles that are tightly covered by a ceramic coating applied with a vapor deposition process described in copending application Ser. No. 716,865, filed on Mar. 28, 1985. Therefore, the process of this invention is especially applicable to those metal electrode particles that are bonded to the electrolyte by ceramic coatings applied by electrochemical vapor deposition (EVD). Fuel electrodes which are bonded by this process adhere without flaking even when they are totally oxidized. This is very surprising in view of the thickness of the ceramic skeleton formed by EVD. The method of this invention, in addition to producing fuel electrodes for solid oxide fuel cells, can also be used to produce electrodes for solid state electrolyzers and gas sensors.

The following example further illustrates this invention.

EXAMPLE

A tube was prepared 400 mm long and 13 mm in diameter consisting of a 2 mm thick porous support tube of calcia stabilized zirconium, a 1 mm thick air electrode of doped lanthanum manganite on top of the support tube, and a 50 μm thick electrolyte of yttria stabilized zirconia $(ZrO_2)_{0.90}(Y_2O_3)_{0.10}$ on the air electrode. A 100 micron thick layer of five micron nickel powder was deposited over the electrolyte by means of slurry dipping. The nickel powder was about 50% porous. A ceramic coating of yttria stabilized zirconia was deposited around the nickel powder particles according to a process described in copending U.S. patent application Ser. No. 716,865, filed on Mar. 28, 1985. The nickel particles were electrochemically oxidized by placing the cell tube in a quartz test envelope heated to 1000° C. Nitrogen was substituted for a gaseous fuel and air was passed through the inside of the cell tube. The current drawn from the cell tube was 50 milliamps per square centimeter (5 A total) for 6 minutes, the time required to oxidize about 9 atom % of the nickel particles (about 6 g total). Fuel, consisting of hydrogen, was then passed over the outside of a tube at the same temperature and the cell voltage of the tube was monitored. When the potential had increased from 600 millivolts to over 1000 millivolts, the treatment was terminated. A comparison of performance of the treated cell with an untreated cell showed that the treated cell had a voltage output of nearly 150 millivolts higher than the untreated cell. A 3-cell stack made from cells that were treated in this fashion were subjected to more than 23 complete thermal cycles between room temperature and 1000° C. without any adverse affect on cell performance.

In additional experiments, electrochemically treated cermet electrodes prepared according to the method of this invention were tested in the electrolysis of steam to hydrogen and oxygen. The cells performed very well.

What we claim is:

1. A method of increasing the cell voltage of an electrochemical cell having a porous metal electrode in contact with a oxygen-transporting vapor deposited ceramic electrolyte comprising
    (A) heating said metal electrode particles to at least their oxidation temperature;
    (B) passing oxygen through said oxygen-transporting ceramic electrolyte to the surface of said metal electrode particles, whereby a portion of said metal electrode particles are oxidized, forming a metal oxide layer between said metal electrode particles and said electrolyte; and (C) reducing said metal oxide layer to said metal.

2. A method according to claim 1 wherein said electrochemical cell is a fuel cell and said oxidation temperature is about 600° to about 1200° C.

3. A method according to claim 1 wherein about 1 to about 100 atom % of said metal electrode is oxidized.

4. A method according to claim 1 wherein said metal oxide layer is reduced by exposing it to a gaseous fuel at a temperature at which said metal oxide layer is reduced to metal.

5. A method according to claim 4 wherein said fuel is selected from the group consisting of hydrogen, carbon monoxide, methane, and mixtures thereof.

6. A method according to claim 4 wherein said oxide layer is reduced until the potential across said cell increases to about the potential of said fuel versus air.

7. A method according to claim 1 wherein said metal oxide layer is reduced electrochemically by applying a reversed polarity from a DC power supply.

8. A method according to claim 1 wherein said metal electrode particles are selected from the group consisting of nickel, cobalt, iron, copper, chromium, and mixtures and alloys thereof.

9. A method according to claim 8 wherein said metal electrode particles are selected from the group consisting of nickel and cobalt, and mixtures and alloys thereof.

10. A method according to claim 1 wherein said metal electrode particles are bonded to said electrolyte by means of a vapor deposited ceramic oxygen-conducting coating, which acts as a portion of said electrolyte.

11. A method according to claim 10 wherein said ceramic coating is about 0.5 to about 20 μm microns thick.

12. A method according to claim 1 wherein said metal electrode particles are about 1 to about 50 microns in size, and said metal electrode is about 10 to about 500 microns thick.

13. In an electrochemical cell having a powdered metal electrode bonded to an oxygen ion conducting ceramic electrolyte by means of an oxygen ion conducting ceramic coating which forms part of said electrolyte, an improved method of increasing the voltage of said cell comprising
(A) heating said cell to a temperature at which said metal electrode oxidizes;
(B) diffusing oxygen ions through said electrolyte to said metal electrode that is in contact therewith, until about 1 to about 100 atom % of said metal electrode in contact with said electrolyte is oxidized, to form a metal oxide layer between said metal electrode and said electrolyte; and
(C) exposing said metal oxide layer to gaseous fuel while heating said fuel cell to a temperature at which said fuel reduces said metal oxide completely to said metal.

14. An electrochemical cell comprising a powdered metal electrode bonded to an oxygen ion conducting electrolyte by means of an oxygen ion conducting ceramic coating which forms part of said electrolyte, where said cell has been treated according to the method of claim 13 to produce a porous metal layer between said powdered metal electrode and said oxygen ion conducting electrolyte.

* * * * *